United States Patent [19]
Yamada et al.

[11] 3,724,312
[45] Apr. 3, 1973

[54] SOUNDBOARDS FOR STRING INSTRUMENTS HAVING PLASTIC FOAM BODY WITH HARDER OUTER LAYERS

[75] Inventors: Takashi Yamada, Hamamatsu; Toyosaku Matsumoto, Toyohashi, both of Japan

[73] Assignee: Nippon Gakki Seizo Kabushiki Kaisha, Shizuoka-ken, Japan

[22] Filed: Mar. 23, 1971

[21] Appl. No.: 127,183

[30] Foreign Application Priority Data

| | | |
|---|---|---|
| Mar. 26, 1970 | Japan | 45/25052 |
| Mar. 26, 1970 | Japan | 45/25053 |
| Apr. 10, 1970 | Japan | 45/30317 |
| Mar. 26, 1970 | Japan | 45/28389 |

[52] U.S. Cl. ................................. 84/193, 84/195
[51] Int. Cl. ..................................... G10c 3/06
[58] Field of Search ........................... 84/192–196

[56] References Cited

UNITED STATES PATENTS

| | | | |
|---|---|---|---|
| 3,477,330 | 11/1969 | Bert | 84/193 |
| 2,469,522 | 5/1949 | Sauerland | 84/192 |
| 1,078,266 | 11/1913 | Edison | 84/192 |
| 1,870,171 | 8/1932 | Buckley | 181/31 |

*Primary Examiner*—Richard B. Wilkinson
*Assistant Examiner*—Lawrence R. Franklin
*Attorney*—Flynn & Frishauf

[57] ABSTRACT

A soundboard is made of a body of plastic foam material which is supplemented by means for improving the vibration transmission characteristics. The means may be a pair of cross-grained thin sheets of harder material than the plastic foam material bonded on both surfaces of the body or may be inserts of harder material disposed in through-holes perforated in the soundboard, the inserts abutting directly on a bridge and ribs, respectively, coupled to both surfaces of the soundboard.

15 Claims, 11 Drawing Figures

PATENTED APR 3 1973 3,724,312

SOUNDBOARDS FOR STRING INSTRUMENTS HAVING PLASTIC FOAM BODY WITH HARDER OUTER LAYERS

This invention relates to soundboards for string musical instruments and more particularly to those adapted for use in a piano.

A string musical instrument, for example, a piano is provided with a soundboard to transmit the vibrations of the strings to the air so that an increased sound output is obtained. The conventional soundboard has generally been made of spruce wood. Since the spruce which is of natural growth does not have uniform quality, it presents difficulties in providing soundboards having uniform performance. Further, a wooden soundboard expands or contracts according to variations in ambient temperature or humidity, with the resulting change in the quality of musical tones transmitted therethrough. The too small internal loss of the spruce also leads to prominent variations in the volume of high pitch tones when they are transmitted through a soundboard prepared from the wood. Further, the characteristic quality of the spruce limits the ratio of Young's modulus to a density which is desired to be sufficiently large to obtain good responses with respect to high pitch tones. Since the spruce soundboard naturally has grains which cause the vibrations of the strings to be transmitted predominantly in the direction of the grains, it is necessary for elimination of this drawback to mount ribs on the soundboard at right angles to the direction in which the grains are formed.

To avoid the aforementioned disadvantage of a wooden soundboard, there has been proposed in recent years the application of a different type of soundboard prepared from a foamed plastic material. Such soundboard is little affected by ambient temperature and humidity and permits easy manufacture. However, this type of soundboard has shortcomings. That is, the foamed resin material has not only elasticity but relatively large viscosity as well, and the vibration energy applied thereto quickly disappears and fails to be transmitted to the surrounding area. In other words, the frequency characteristics of the aforesaid soundboard decrease as the sounds to be generated have higher frequency.

The object of this invention is to provide a soundboard which is little affected by ambient temperature and humidity, presents proper internal loss, permits easy manufacture and has good vibration transmission characteristics.

SUMMARY OF THE INVENTION

According to an aspect of this invention, there is provided a soundboard for use in a string musical instrument which comprises a body of plastic foam material, and means for improving the vibration transmission characteristics, the means comprising first and second reinforcement members made of harder material than the plastic foam material bonded to the major surfaces of the plastic foam material the grains or fibers of the reinforcement members crossing each other substantially at right angles to each other.

As used herein and in the claims appended hereto, the term "fibers" denotes not only unidirectionally fibers in a plastic-type material, but also the grain of a wooden material.

This invention can be more fully understood from the following detailed description when taken in connection with the accompanying drawings, in which.

Figure 1:
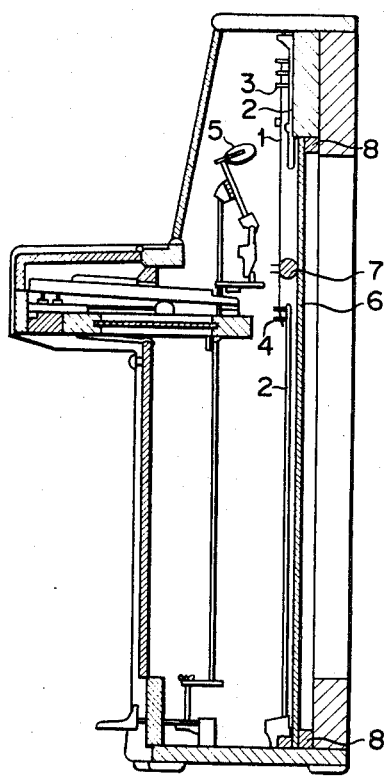
FIG. 1 is a longitudinal sectional view of an upright piano.

There will now be described by reference to FIG. 1 the construction of a piano in which there is applied the soundboard of this invention. Stretched across a piano frame 2 is a plurality of strings 1 fastened to tuning pins 3 and hitch pins 4. When the string 1 is struck with a hammer 5 to generate tones, the vibrations of the string 1 are transmitted to a soundboard 6 through a bridge 7 mounted thereon against which there is pressed the string 1, so as to produce tones in amplified form. The peripheral edge of the soundboard 6 is fixed to a supporting frame 8. While FIG. 1 represents an upright piano, a grand piano has a similar construction.

Figure 2:
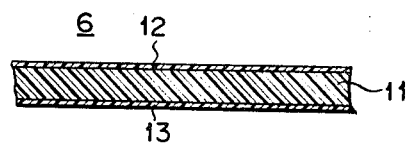
FIG. 2 is a sectional view of a soundboard according to an embodiment of this invention for use in a piano.

FIG. 2 illustrates a soundboard according to an embodiment of this invention. According to this embodiment, the soundboard 6 is prepared by sandwiching a low density core 11 made of a plastic foam material such as a foamed form of acryl, styrol or urethane between first and second thin reinforcement members 12 and 13 consisting of glassfiber reinforced plastic harder than the plastic foam material. The core 11 has a thickness of 8 to 13 mm and a specific gravity of 0.05 to 0.3, preferably 0.1. The reinforcement members 12 and 13 are formed of a glass mat or cloth whose fibers intersect each other substantially at right angles or another type of glass cloth prepared by laminating two sheets each having a roving stretched only in one direction in such a manner as to cause the rovings to intersect each other at right angles.

The plastic materials reinforced by the glassfiber to form the aforementioned glassfiber reinforced plastics may consist of polyester or epoxy resin. The reinforcement member 12 or 13 preferably has a thickness of 0.5 to 1.0 mm. Since these members 12 and 13 can be formed into pre-preg sheets and thermally set at a temperature of about 100°C on the surface of the core 11, there is no need to use any extra adhesive to bond the core 11 and reinforcement members 12 and 13 together. The reinforcement members 12 and 13 thus formed act as means for improving the vibration transmission characteristics of the core 11. Further, the soundboard 6 as a whole should preferably have a specific gravity of about 0.3 to 0.5.

With the soundboard according to the embodiment of FIG. 2, there is used synthetic resin in the core 11 and reinforcement members 12 and 13 to realize a large ratio (about $32.4 \times 10^{10}$) of Young's modulus to density. The thickness of the core 11 may be varied to cause a soundboard to have an optimum stiffness and weight. The glass-fiber reinforced plastic members whose internal loss is appreciably larger than in a spruce soundboard gives good results as the sound propagating member of a string musical instrument. The reinforcement member made of resin-impregnated glass may be formed to a thickness of 0.5 to 1 mm so as to obtain great stiffness. This helps tones ranging from a low to a high pitch to be transmitted in good condition. Since the glassfibers constituting the reinforcement member intersect each other at right angles, there is no need to use ribs. The soundboard of FIG. 2 entirely formed of synthetic resin is little affected, as is naturally expected, by ambient temperature and humidity.

FIGS. 3 to 6 illustrate a soundboard according to another embodiment of this invention. The core 21 is prepared, as in the embodiment of FIG. 2, from a foamed form of acryl, styrol or urethane with a thickness of 8 to 13 mm. In the case of FIGS. 3 to 6, there are bonded to both sides of the core 21 reinforcement members each 0.5 to 1.0 mm thick made of wooden material such as lauan or birch. Reinforcement members 22 and 23 or 24 and 25 are so laminated on each side of the soundboard as to cause the grains extending in the direction of the arrows of FIG. 4 to intersect each other at right angles.

Figure 3:
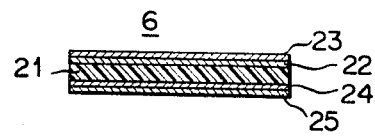
FIG. 3 is a sectional view of a soundboard according to another embodiment of the invention.
Figure 4:
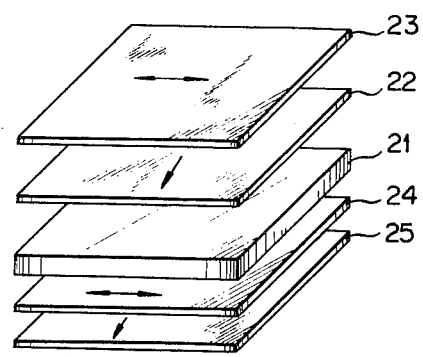
FIG. 4 is an exploded perspective view of the soundboard of FIG. 3.

With the laminated soundboard of FIGS. 3 and 4, the grains of two reinforcement members laminated on either side of the core 21 intersect each other at right angles, so that the magnitudes of flexural rigidity in the directions of the respective grains can be balanced, eliminating the necessity of additionally using ribs as is the case with the conventional soundboard. This has the further advantage that a resonance of 1,000 to 3,000Hz which would otherwise be generated between the adjacent ribs is removed and the soundboard is lightened by the weight of the ribs, thereby increasing the sound transmission efficiency.

The wooden reinforcement member has a relatively large flexural rigidity, enabling elastic waves derived from the vibration energy applied thereto to be transmitted through the entire soundboard in good condition, and displaying a full sound-propagating characteristic with respect to tones ranging from a low to a high pitch.

Where the outermost wooden reinforcement members 23 and 25 are so disposed as to cause the directions of the grains to intersect each other at right angles as shown in FIG. 4, the soundboard can be made, after bonding, to warp for better propagation of sounds, utilizing the fact that the soundboard expands or contracts according to ambient temperature to different degrees between the grain direction and another direction perpendicular thereto. An adhesive for the reinforcement member preferably consists of water-soluble vinyl acetate systems or glue.

Figure 6:
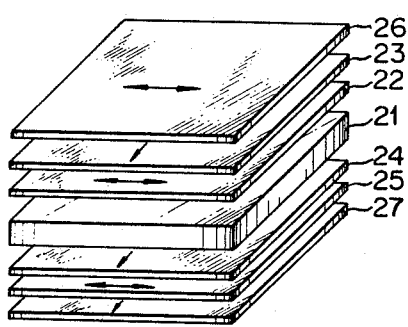
FIG. 6 is an exploded perspective view of another modification of the soundboard of FIG. 3.
Figure 5:
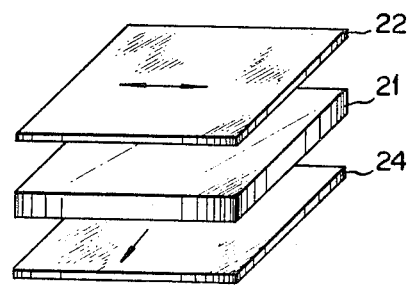
FIG. 5 is an exploded perspective view of a modification of the soundboard of FIG. 3.

FIGS. 5 and 6 illustrate modifications of FIGS. 3 and 4 respectively. With the soundboard of FIG. 5, there are mounted on both sides of the core 21 wooden reinforcement members 22 and 24 respectively so as to cause the directions of grains to intersect each other at right angles.

With the soundboard of FIG. 6, there are laminated on each side of the core 21 three wooden reinforcement members as 22 – 23 – 26 and 24 – 25 – 27 in such a manner that the grain directions of the adjacent reinforcement members intersect each other at right angles.

Figure 7:
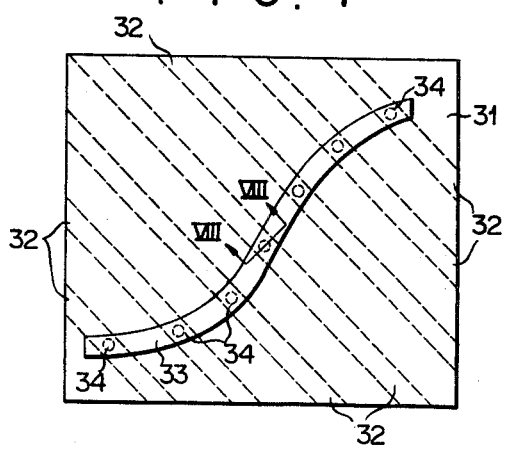
FIG. 7 shows an elevation of a soundboard according to another embodiment of the invention.
Figure 8:
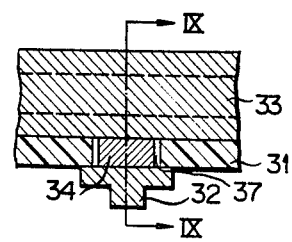
FIG. 8 is a sectional view on line VIII—VIII of FIG. 7.
Figure 9:
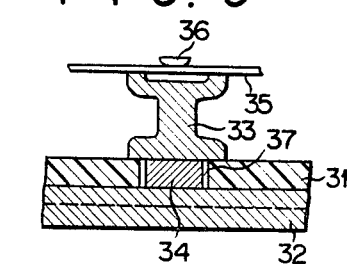
FIG. 9 is a sectional view on line IX—IX of FIG. 8.

FIGS. 7 to 9 illustrate a soundboard according to another embodiment of the invention. According to this embodiment, the soundboard of a plastic foam material is not supplemented by reinforcement plate members as in the above embodiments. The soundboard is reinforced only by a number of conventional rib members.

However, it has been found that if a soundboard body of plastic foam material is supplemented only by a number of spaced rib members attached to one side of the soundboard body, such soundboard shows a very poor vibration propagation characteristic. On such soundboard, a bridge is connected to the rib members with the soundboard body of plastic foam material interposed therebetween. This body of plastic foam material naturally has a low stiffness in the direction of its thickness and is liable to be compressed easily, having a tendency not to be vibrated sufficiently in full conformity with the vibration of the bridge. Therefore, the vibration transmitted to the bridge from the strings is mostly damped by the soundboard body, failing to be transmitted further to the rib members with most of the vibration energy lost at that soundboard body. This loss of vibration energy becomes high, especially at the treble or high frequency tone region. Namely, the higher the frequency at which the bridge vibrates, the more prominent the loss becomes. Accordingly, particular consideration should be given to the case wherein the soundboard body of plastic foam material is provided with rib members, in order to assure effective transmission of the vibration of the bridge to the rib members.

FIGS. 7 to 9 illustrate an improved device or means for improving the vibration transmission characteristics of such soundboard. Throughout FIGS. 7–9, numeral 31 generally represents a soundboard of a plastic foam material of any of the forms shown in FIGS. 1–11. On the underside of the soundboard 31 are arranged side by side a plurality of ribs 32 in a diagonal direction, the ribs being fixedly attached to the soundboard. On the upper surface of the soundboard is mounted a bridge 33 intersecting the ribs 32 at an angle thereto. Those parts of the soundboard 31 which are disposed between the plural ribs 32 and bridge 33 are perforated with through holes 37. Into the through holes 37 are inserted ring-shaped members 34 made of harder material than the plastic foam material and having an excellent capacity of transmitting vibrations. The members 34 may consist of metal such as aluminum or wooden materials such as maple, beech, or box-wood or thermosetting resins of little shrinkage such as epoxy or polyester. The ring-shaped members 34 are formed with an equal thickness to that of the soundboard 31 and are so disposed in the holes 37 as to abut on the bridge 33 and ribs 32.

According to the aforementioned embodiment, the bridge 33 and ribs 32 are joined together by means of the ring-shaped members or inserts 34. Since the members 34 are made of a material having a good vibration transmitting capacity, that is, a large compression strength, vibrations of the bridge 33 resulting from those of the string are transmitted to the ribs without being attenuated by the foamed resin material constituting the soundboard, enabling high frequency tones as well as the high harmonics associated with bass, medium and treble tones to be fully generated. Referring to FIG. 9, numeral 35 denotes a string and 36 a string holding member.

The soundboard of the aforementioned various constructions is fixed to a support frame on the peripheral edge, increasing the flexural rigidity of the peripheral portion and in consequence unavoidably deteriorating the vibration characteristics of the soundboard.

Therefore, with a soundboard whose core consists of foamed resin material, it may be contemplated to reduce the peripheral thickness of the core for improvement of the vibration characteristics of the soundboard. Such method, however, presents practical difficulties. Alternatively, it may be considered to form notches or many holes along the peripheral edge of the soundboard in order to decrease the stiffness of the peripheral portion. With the soundboard of this invention, however, which comprises a core and reinforcement members laminated thereon, as in FIGS. 3 to 6, using an adhesive agent of synthetic organic material, the adhesive agent coated on the inner wall of the aforementioned notches or holes is deteriorated in quality during long exposure to the atmosphere, resulting in a prominent decrease in the mechanical strength of the core and the bonding force of the adhesive agent.

Figure 10:
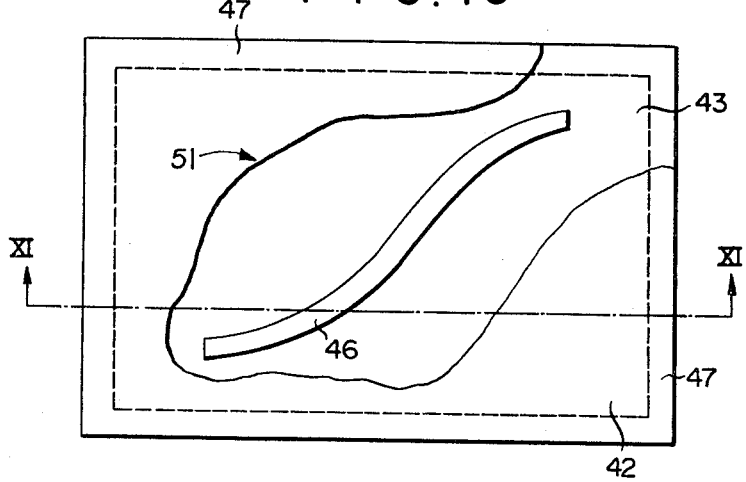
FIG. 10 is an elevation of a soundboard according to still another embodiment of the invention.
Figure 11:
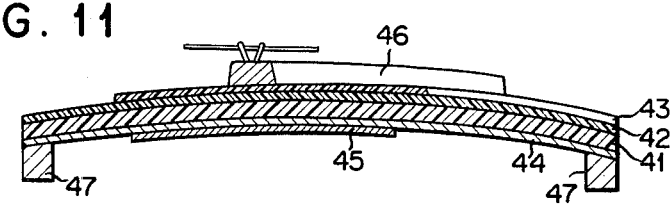
FIG. 11 is a sectional view on line XI—XI of FIG. 10.

In view of the aforementioned drawbacks, there is provided, as illustrated in FIGS. 10 and 11, a soundboard which is improved in the vibration characteristics by reducing the stiffness of its peripheral portion. As in the above-mentioned embodiments, there is laminated on each side of a foamed resin core 41 of 8 to 11 mm thickness groups consisting of a plurality of (for example, two) reinforcement members as 42 - 43 and 44 - 45, respectively, made of aluminum, glassfiber reinforced plastic, or wood. If there is used an aluminum sheet, it is only required to be 0.3 to 0.5 mm thick. The inner reinforcement members 42 and 44 brought into direct contact with the core 41 have an equal area thereto so as fully to face it. The other outer reinforcement members 43 and 45 have a smaller area than the inner reinforcement members 42 and 44. Member 43 has an irregular shape as shown by its outline 51 in FIG. 10. As indicated in FIG. 11, only part of the periphery of the outer reinforcement member 43 contacts the inner reinforcement member 42. On the outer reinforcement member 43 is disposed a bridge 46. The inner reinforcement member 44 is fixed on the peripheral edge to a frame 47.

A soundboard of the aforementioned construction is formed thinner on the periphery than at the central part so as to be reduced in stiffness at the periphery and in consequence exhibit improved vibration characteristics.

What we claim is:

1. A soundboard for use in a string musical instrument comprising: a body of plastic foam material; a bridge attached on one surface of said body; rib members attached on the other surface of said body and crossing said bridge at angles thereto; said body having through-holes perforated between said bridge and said rib members; and a plurality of inserts of harder material than said plastic foam material, said inserts being disposed in said through-holes and abutting on said bridge and rib members.

2. A soundboard for use in a string musical instrument comprising:
 a body of plastic foam material, said body having generally opposing major surfaces; and first and second reinforcement members bonded respectively on both major surfaces of said body, said reinforcement members having substantially unidirectionally running fibers, the fibers of said reinforcement members crossing substantially at right angles to one another, and said reinforcement members being formed of harder material than said body.

3. A soundboard as claimed in claim 2 wherein the fibers of said first reinforcement member run substantially in one direction, and the fibers of said second reinforcement member run in a direction substantially perpendicular to said one direction.

4. A soundboard as claimed in claim 2 wherein each of said first and second reinforcement members comprises a plurality of layers bonded together, the fibers of adjacent ones of said layers crossing substantially at right angles to each other.

5. A soundboard as claimed in claim 2 further comprising third and fourth reinforcement members bonded respectively on said first and second reinforcement members, said third and fourth reinforcement members being formed of harder material than said body, said third and fourth reinforcement members being smaller in area than said first and second reinforcement members.

6. A soundboard as claimed in claim 5 wherein said third and fourth reinforcement members are disposed substantially on the central part of said soundboard body.

7. A soundboard as claimed in claim 5 further comprising: a bridge attached on the outer surface of said third reinforcement member; rib members attached on the outer surface of said fourth reinforcement member, said rib members crossing said bridge at angles thereto; and a plurality of inserts of harder material than said plastic foam material, said inserts being disposed in through-holes perforated in said soundboard body and abutting on said bridge and rib members.

8. A soundboard as claimed in claim 5 wherein said third and fourth reinforcement members have a higher Young's Modulus than that of said body.

9. A soundboard as claimed in 2 further comprising a bridge attached on the outer surface of said first reinforcement member; rib members attached on the outer surface of said second reinforcement member, said rib members crossing said bridge at angles thereto; and an insert of harder material than said plastic foam material, said insert being disposed in a through-hole perforated in said soundboard body and abutting on said bridge and rib members.

10. A soundboard as claimed in claim 9 comprising a plurality of said inserts disposed in respective through-holes perforated in said soundboard body, said inserts abutting on said bridge and rib members.

11. A soundboard as claimed in claim 2 wherein said reinforcement members are substantially thinner than said body of plastic foam material.

12. A soundboard as claimed in claim 2 wherein said reinforcement members comprise members formed of hard wood.

13. A soundboard as claimed in claim 2 wherein said reinforcement members comprise members formed of plastic material reinforced with unidirectionally running glass fibers.

14. A soundboard as claimed in claim 2 wherein said reinforcement members have a higher Young's Modulus than that of said body.

15. A soundboard as claimed in claim 2 wherein said reinforcement members comprise members formed of wooden material, said unidirectionally running fibers comprising the grain of said wooden material.

* * * * *